United States Patent [19]

Pahl

[11] 4,221,090
[45] Sep. 9, 1980

[54] STILT CONSTRUCTION FOR DWELLINGS AND THE LIKE

[76] Inventor: Robert A. Pahl, 4914-F24 Hawaii Blvd., Naples, Fla. 33942

[21] Appl. No.: 951,479

[22] Filed: Oct. 16, 1978

[51] Int. Cl.$^2$ .......................... E02D 27/16; E04D 1/34
[52] U.S. Cl. ..................................... 52/169.9; 52/297; 52/334; 52/573
[58] Field of Search ...................... 52/262, 169.1, 292, 52/299, 263, 295, 296, 73, 334; 405/231

[56] References Cited

U.S. PATENT DOCUMENTS

| | | | |
|---|---|---|---|
| 1,652,415 | 12/1927 | Schenker | 52/299 |
| 2,345,500 | 3/1944 | Petter | 52/262 |
| 3,184,893 | 5/1965 | Booth | 405/231 |

*Primary Examiner*—John E. Murtagh

[57] ABSTRACT

A stilt construction for a dwelling house is comprised of a core structure having a reinforced turned-down edge core slab and a plurality of wooden core pilings set into the earth to extend upward through the slab; moment-reacting connectors anchor the core slab perpendicularly to the pilings. A beam structure, horizontally supported by the tops of the core pilings, extends outward of the core to the tops of pilings remote from the core structure. Earth-supported slabs, which lay beneath the beam structure outboard of the core, are not anchored to the remote piles and are free to settle. An upper floor is supported upon the beam structure, while walls for the lower floor are suspended from the beam structure. Sill members along their lower edges adjacent to the earth-supported slab do not rely on it for bearing. The core structure, which contains water and sewer connections, is maintained horizontal because the integrated structure resists non-uniform settling and lateral movement; while the earth-supported slab, which forms the floors for garages, workshops and other recreation areas outboard of the core structure, may settle without disturbing the walls thereabove.

10 Claims, 5 Drawing Figures

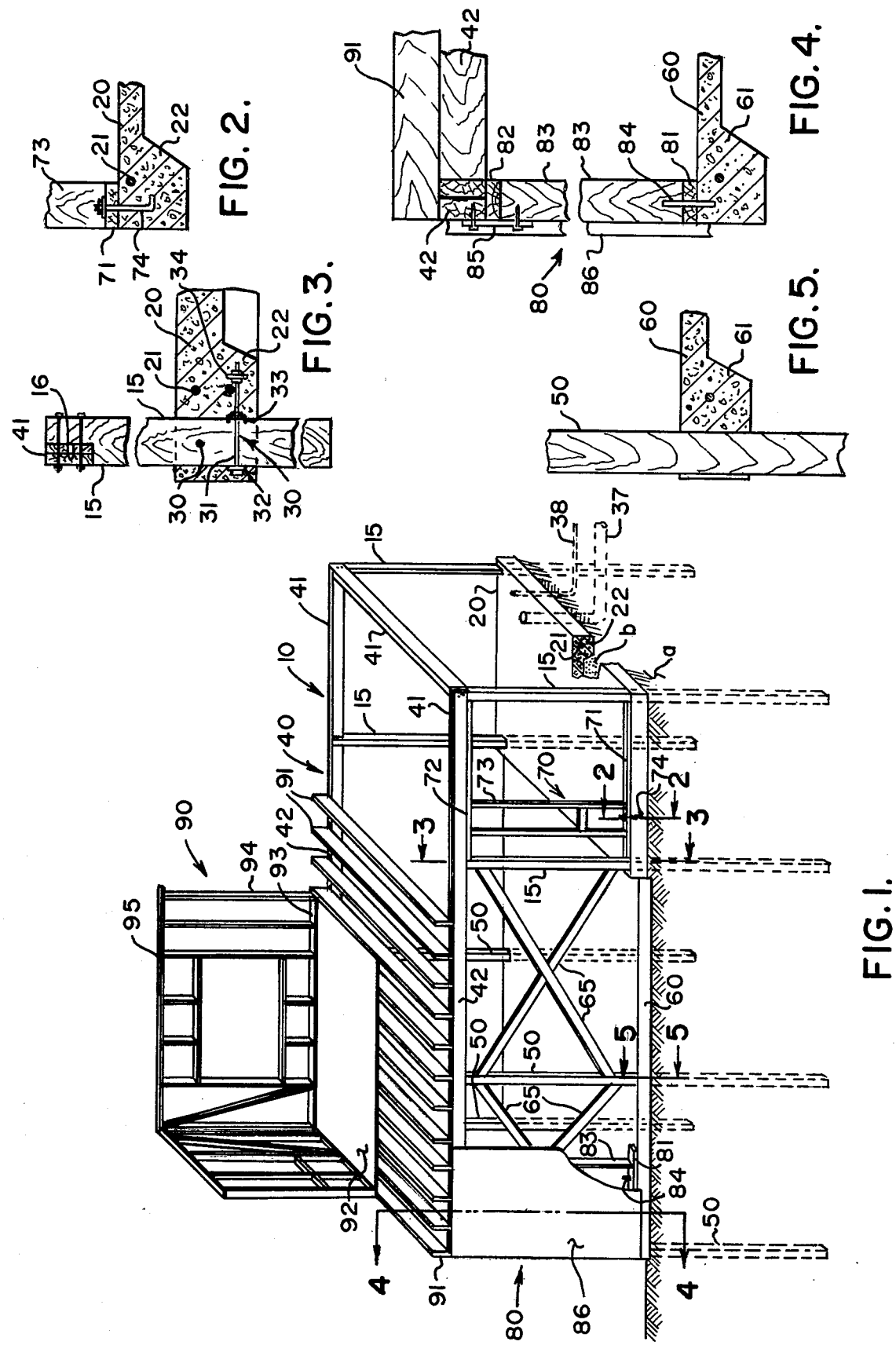

STILT CONSTRUCTION FOR DWELLINGS AND THE LIKE

BACKGROUND OF THE INVENTION

The present invention relates to a dwelling house stilt construction, built on sandy soils near the ocean or gulf, which is particularly resistant to destruction by high winds and flood waters.

Buildings constructed near the ocean are subject to severe storms, sometimes having winds of hurricane force and high flood waters. Often these buildings are constructed on sandy soil or sand itself. Sound construction practice requires that dwellings incorporate features of construction which can withstand these storms while sustaining only minimum damage.

Typical constructions designed to withstand such storms utilize pilings, ending below grade level, which support a concrete slab. Concrete blocks, laid up on the slab, form the first story and support beams upon which the second story is constructed. Such construction is expensive, both in the cost of material and labor. In some constructions, concrete block walls form only a central core area of the first story; outward of this central area, pilings extend upward to and support the second story. The sand soil allows lateral movement of the pilings; the slabs which they support, along with the dwelling above, may twist and tilt, causing water and sewer connections to break and walls and stairways to develop cracks and gaps. Pilings which extend above grade level without restraint thereat are subject to even more extreme shifting and tilting in the sandy soil.

SUMMARY OF THE INVENTION

An object of the present invention is to provide a building construction capable of withstanding severe storms with high winds and flood waters. A second object is to provide a building construction especially suited for sandy soils. Another object is to provide a stilt construction dwelling which appears to be a conventional dwelling rather than an unsightly stilt dwelling, may be built on sandy soils, and will withstand such severe storms.

Briefly summarizing, the present invention is a stilt construction for a dwelling comprised of a core structure including a core slab poured over a compacted fill and having a monolithic footing, and three or more treated wood core pilings, each set into the earth and extending upward through the core slab at the monolithic footing. Moment-reacting connectors anchor the core pilings to the core slab to maintain them perpendicular. A horizontal beam structure is bolted to the tops of the core pilings and extends outward to define the area of the dwelling. Other treated wood pilings, remote from the core, are set into the earth, with their tops bolted to the beam structure. Earth-supported slabs, also poured over compacted fill, which complete that area beneath the beam structure outboard of the core area, need not be anchored to the remote pilings.

The core slab and earth-supported slabs form the floor for the lower level of the dwelling. Settling of the anchored core slab is minimal and uniform if it should occur; thus, sewer and water connections may be made there. Unanchored earth-supported slabs, which are free to settle with the earth below, may be utilized for the garage, workshop and recreation areas. The beam structure, maintained horizontal by the core structure, supports the upper level of the dwelling, which may be a conventionally framed structure. The walls about the unanchored earth-supported slabs outboard of the core are suspended from the beam structure; each terminates in a lower sill so secured to the remote slab as to permit the slab to settle relative to and without damage to the walls, and to permit the walls to break away during severe storms rather than have the dwelling totally destroyed.

BRIEF DESCRIPTION OF THE DRAWINGS

FIG. 1 is an oblique, somewhat schematic view of a stilt dwelling under construction embodying the present invention.

FIG. 2 is a section taken along line 2—2 of FIG. 1.

FIG. 3 is a section taken along line 3—3 of FIG. 1, showing a core piling bolted to the beam structure and moment-reacting connectors anchoring the core piling to the core slab.

FIG. 4 is a section taken along line 4—4 of FIG. 1, showing a portion of a wall suspended from the beam structure.

FIG. 5 is a section taken along line 5—5 of FIG. 1, showing the moment-permitting connection between one of the remote pilings and the remote area slab.

DESCRIPTION OF THE PREFERRED EMBODIMENT

The preferred embodiment of the present invention is a two-story dwelling, shown constructed on sandy soil a, as near an ocean. The building site has a thin layer of clean earth b over the sand a, hauled in, compacted, and leveled to provide a proper surface for construction, which includes pouring concrete.

In the illustrated embodiment, which is shown somewhat simplified, a core structure or core area 10, so named because it bears most of the lateral and vertical loads of the dwelling, has four wooden pilings 15, arranged in a rectangular pattern. Each piling 15 may be of 8"×8" pressure-treated southern yellow pine with maximum rot and insect treatment, and is about twenty-eight feet long. Each is set into the ground, by augering a hole and placing or by driving to the proper depth for the desired load; for example, about eighteen feet. Notches 16 on the outer side of the upper ends of the core pilings 15 receive beams, described below. Construction of the dwelling begins with placement of the pilings.

The core structure 10 has a horizontal earth-level core slab 20, generally four inches in thickness and reinforced by reinforcing bars 21, shown in FIG. 3. The core slab 20 has, at its outer edges, deepened portions, twelve inches in thickness, forming a turned-down edge footing 22 for the slab 20, also commonly called a monolithic grade beam or a monolithic footing. The core slab 20 is of such area as to extend in rectangular fashion between the outer sides of the core pilings 15.

Where the core slab 20 and core pilings 15 meet, they are anchored together by moment-reacting connectors, generally designated 30, made up of shear connectors comprised in part of a ¾" steel bolt 31, about fourteen inches in length, which extends through a hole in the piling 15. A washer 32 on the outer side of the piling 15 prevents the bolt head from pulling through the piling 15, while a cup-shaped shear plate 33 is fixed on the bolt by a nut on the inner side of the piling 15. The bolt 31 extends into the slab footing 22 and carries on its threads, between two nuts, a steel plate or washer 34.

Two such moment-reacting connectors 30 are utilized for each core piling 15, one perpendicular to the other at different levels; they are placed in the piling 15 prior to pouring the concrete. The connectors 30 may support the reinforcing bars 21 before the slab 20 is poured.

Conventional sewer piping 37 and water piping 38 extends upward through the core slab 20, as shown schematically in FIG. 1.

A horizontal beam structure 40, made up of 2"×12" lumber, is bolted in the notches 16 at the top of the core pilings 15, as shown at the top of FIG. 3. The beam structure 40 extends outboard of the core area 10, defining the remainder of the dwelling area. This outboard portion of the beam structure 40 is referred to as the remote portion 42, to contrast with the core area beam structure portion 41. Tieing of the horizontal beam structure 40 to the core pilings 15 and the remote pilings hereinafter mentioned may be done prior to or concurrently with pouring the core slab 20.

The preferred embodiment has outboard of the core area 10, extending up to the beam structure 40, remote pilings 50 of wood like that of the core pilings, set into the ground in the same manner. The remote pilings 50 have, at their upper ends, notches, identical to the notches 16 in the core pilings 15, which receive the beam structure remote portion 42 secured similarly by bolting.

Beneath the beam structure remote portion 42, which is outboard of the core area 10, is provided an earth-supported reinforced concrete slab 60 having a turned-down edge footing 61. The earth-supported slab 60 is not anchored to the remote pilings 50 about which it is poured, as shown in FIG. 5, and thus may settle relative to the remote pilings 50, as suggested in FIG. 1.

To further restrain shifting of the remote pilings 50 and twisting of the dwelling outboard of the core area 10, wooden "X" brace members 65 may be used, to extend diagonally downward and outward from the beam structure 40 to join remote pilings 15 above the earth-supported slab 60, as shown in FIG. 1. Alternately, wooden knee bracing or pairs of steel straps may be used.

In the core area 10, the outer walls, generally designated 70, are framed-up of 2"×4" lumber, including a sill 71, plate 72 and studs 73. The sill 71 is anchored to the core slab 20 by J-bolts 74, shown in FIG. 12, placed prior to pouring the slab 20. By the addition of plywood panels, not shown, nailed to the outer side of the framed outer walls 70, and by fixing these walls to the core pilings 15, the outer walls 70 may serve as shear-resisting walls to supplement the bending strength of the core pilings, if required.

In the remote area, where the earth-supported slab 60 may settle, lower walls, generally designated 80 and best seen in FIG. 4, are framed-up with a sill member 81, plate 82 and studs 83, similar to the core outer walls 70. The lower walls 80 are suspended from the horizontal beam structure remote portion 42 by steel vertical connector straps 85. The slab 60 is free to sink vertically relative to the lower walls 80, which are restrained horizontally only by small vertical pins 84, placed in the earth-supported slabs 60 before pouring and extending upward through the sill member 81. The construction of the lower walls 80 lends itself to use of a conventional wall covering 86, such as stucco.

The level 90 of the stilt dwelling is constructed upon the horizontal beam structure 40; floor joists 91 span the beam structure 40 and support a plywood subfloor 92. Upper walls are constructed upon the subfloor 92 and include a lower sill member 93 and studs 94 extending upward to a plate 95.

This stilt dwelling house construction will remain with its core area 10 and beam structure 40 horizontal, regardless of adverse conditions which cause haphazard settling of the earth-supported slab 60. Though the dwelling is constructed on sandy soil which provides little subjacent support, high winds will not cause shifting.

These results are achieved by the unique moment-reacting anchoring of the wooden core pilings 15 to the concrete core slab 20 together with the horizontal beam structure 40 bolted to the piling tops. By this construction, the core pilings 15 can only remain perpendicular to the core slab 20 and parallel to each other, substantially reducing the likelihood that any individual core piling 15 will settle or laterally tip. The beam structure 40 maintains the tops of the remote pilings 50 in fixed position and conveniently provides a horizontal structure upon which the dwelling upper level 90 can be constructed. The walls and roof of the upper level 90 may be constructed before the lower level walls; then construction of the lower level can continue unhindered by the weather.

The wooden pilings are especially suited to this construction, since they have a very great bending strength to withstand high wind loads. The "X" bracing 65 serves to restrain the remote pilings 50 from shifting, particularly at ground level, and resits lateral twisting of the structure.

The walls 80 in the lower level remote area, suspended from the beam structure 40 by the vertical straps 85 and only laterally secured by the small pins 84, will not twist and tilt if the remote slab 60 settles nonuniformly. The lower walls 80 may break away if a wave of water should engulf the lower level, without damage to the support structure of the dwelling. This preferable to a conventional wall which might afford such resistance that the entire structure would be destroyed.

The lower level of the remote area, with its earth-supported slab 60, is utilized only for purposes for which absolutely level floors are not required, for example, workshops, garages, children's play areas and even family rooms. Such uses are consistent with the possibility of slight gaps which might appear between the wall and the slab. In contrast, the core area 10 contains sewer and water connections, and may have stairways, all likely to be impaired by tilting or non-uniform settling of the slab. The upper level of the dwelling, always maintained level by the combination of the core structure 10 and beam structure 40, is not likely to be damaged by settling sand, high winds or floods.

The above embodiment is a simple example of the preferred construction embodying the present invention. More complex embodiments, as well as other modifications, will suggest themselves. For example, the core area may be surrounded on two, three or four of its sides by the remote area, with a corresponding beam structure. Several core areas might be required, dictated by the size and shape of the dwelling or, where cost is not a factor, every piling may be anchored to the slab by such shear connectors. Portions of the lower level remote area may have an earthen floor, such as for storage. The pilings, which may be of wood or other material of similar bending strength and round or square in cross-section, may be arranged in any manner convenient for supporting the beam structure and the core area; as few as three pilings could be utilized, while many more than four might be required. At each intersection of a core piling and the core slab, the slab may have a deepened portion to aid in restraining the piling perpendicular to the slab. The means to so restrain the piling may be any moment-reacting connector suitable for achoring wood to concrete. In the remote area, the placement of the pilings may take any form sufficient to add the necessary support for the beam structure; again a great number of pilings might be required. As to the construction of the walls, framed-up walls have been described above, but any wall construction might be utilized. The hanging walls may be suspended from the beam structure in any convenient manner. Where a patio or other covered outdoor area is desired, lower walls in the remote area may be omitted. Other modifications will, from the above disclosure, be apparent to persons skilled in the art.

I claim:

1. Stilt construction of dwellings and the like, comprising
   a core structure, including
   a horizontal reinforced earth-level core slab, and
   four or more core piles extending from within the earth to above said core slab arranged in a rectangular pattern, said piles having moment-resisting connection means to said slab to restrain said core piles perpendicular to said slab, said piles extending upwardly to and supporting
   a horizontal beam structure elevated above said slab and having an outstanding portion extending outwardly from said core structure, together with
   a plurality of remote piles in the earth remote from said core slab, their upper ends joined to and providing vertical support for said outstanding portion of said beam structure, said beam structure restraining the upper ends of said remote piles from transverse movement,
   upper walls supported upon said beam structure and extending to a roof thereabove,
   lower walls depending from said outstanding portion of said beam structure and terminating in a lower sill member,
   means to suspend said lower walls from said beam structure regardless of support beneath said sill member, together with
   an earth-supported slab beneath a said outstanding portion of said beam structure ending outwardly beneath said lower wall lower sill member, and
   means to permit downward movement of said earth-supported slab from said lower sill member while restraining said sill member and lower wall thereabove from transverse movement.

2. The stilt construction as defined in claim 1, together with brace means, extending outward from the core structure, to restrain one or more of said remote piles at earth level.

3. Stilt construction of dwellings and the like, comprising
   a core structure, including
   a horizontal reinforced earth-level core slab, and
   three or more core piles extending from within the earth to above said core slab, said piles having moment-resisting connection means to said slab to restrain said core piles perpendicular to said slab, said piles extending upwardly to and supporting
   a horizontal beam structure elevated above said slab and having an outstanding portion extending outwardly from said core structure, together with
   a plurality of remote piles in the earth remote from said core slab, their upper ends joined to and providing vertical support for said outstanding portion of said beam structure, said beam structure restraining the upper ends of said remote piles from transverse movement.

4. The stilt construction as defined in claim 3, wherein
   said moment-resisting connection means are formed at
   integrally-formed deepened portions in said core slab ajacent said piles, and wherein said connection means includes
   tie connector means embedded in said deepened portions and extending to shear connectors through said piles.

5. The stilt construction as defined in claim 3, wherein
   said piles are of treated wood, and wherein
   said core slab is of concrete.

6. The stilt construction as defined in claim 3, together with
   lower walls depending from said outstanding portion of said beam structure and terminating in a lower sill member, and
   means to suspend said walls from said beam structure regardless of support beneath said sill member.

7. The stilt construction as defined in claim 3, wherein
   said beam structure supports thereabove upper walls which extend to a roof thereabove.

8. The stilt construction as defined in claim 7, together with
   an earth-supported slab beneath a said outstanding portion of said beam structure ending outwardly beneath said lower wall lower sill member, and
   means to permit downward movement of said earth-supported slab from said lower sill member while restraining said sill member and lower wall thereabove from transverse movement.

9. The stilt construction as defined in claim 3, together with
   brace means, extending outward from the core structure, to restrain one or more of said remote piles at earth level.

10. Stilt construction of dwellings and the like, comprising
    a horizontal reinforced earth-level slab having a footing, and
    three or more piles extending from within the earth to top ends at a level above said slab, said piles extending upwardly to and supporting
    a horizontal beam structure supported at the top ends of said piles and elevated above said slab,
    upper walls supported upon said beam structure and extending to a roof thereabove,
    lower walls extending between said beam structure and said slab, and
    moment-resisting connection means, connecting said piles to said slab, to restrain said piles perpendicular to said slab,
    said moment-resisting connection means including a pair of shear connectors extending through each said pile into said slab at different levels, at least one being at the level of said footing,
    whereby forces on any such pile tending to cause its departure from perpendicularity to said slab are reacted by opposing forces on said pair of shear connectors.

* * * * *

UNITED STATES PATENT AND TRADEMARK OFFICE
CERTIFICATE OF CORRECTION

PATENT NO. : 4,221,090
DATED : September 9, 1980
INVENTOR(S) : Robert A. Pahl

It is certified that error appears in the above-identified patent and that said Letters Patent are hereby corrected as shown below:

In column 1, line 26, change the word "sand" to read ---sandy---;

In column 3, line 46, change the numeral "12" to read ---2---;

In column 4, line 30, change the word "resits" to read ---resists---;

In column 4, line 38, after the word "This" add the word ---is---;

In Claim 4, line 12, change the word "ajacent" to read ---adjacent---.

Signed and Sealed this

Twenty-fifth Day of November 1980

[SEAL]

Attest:

SIDNEY A. DIAMOND

Attesting Officer

Commissioner of Patents and Trademarks